US012650099B1

(12) United States Patent
Burghdoff et al.

(10) Patent No.: US 12,650,099 B1
(45) Date of Patent: Jun. 9, 2026

(54) LOCKING SYSTEM FOR A THRUST REVERSER OF AN AIRCRAFT

(71) Applicant: The Boeing Company, Arlington, VA (US)

(72) Inventors: Michael Jay Burghdoff, Everett, WA (US); Declan Foley, Summerville, SC (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/969,566

(22) Filed: Dec. 5, 2024

(51) Int. Cl.
*F02K 1/76* (2006.01)

(52) U.S. Cl.
CPC .................................... *F02K 1/766* (2013.01)

(58) Field of Classification Search
CPC ............... F02K 1/766; F02K 1/70; F02K 1/72
See application file for complete search history.

(56) References Cited

U.S. PATENT DOCUMENTS

| | | | |
|---|---|---|---|
| 6,044,641 A | 4/2000 | Baudu et al. | |
| 2011/0030387 A1 | 2/2011 | Kumar et al. | |
| 2011/0215193 A1 | 9/2011 | Welch et al. | |
| 2014/0116024 A1* | 5/2014 | Channel .................... | F02K 1/72 60/226.2 |
| 2016/0281539 A1* | 9/2016 | Linde ...................... | F02K 1/766 |

| | | | |
|---|---|---|---|
| 2017/0342942 A1* | 11/2017 | Smith .................... | G01M 15/14 |
| 2020/0102908 A1* | 4/2020 | Kelford ..................... | F02K 1/72 |
| 2020/0102909 A1* | 4/2020 | Kopecek ............... | B64D 33/04 |
| 2022/0178330 A1 | 6/2022 | Glemarec et al. | |
| 2023/0228230 A1* | 7/2023 | Alstad ...................... | F02K 1/72 60/226.2 |
| 2023/0313756 A1* | 10/2023 | Trezieres ................ | F02K 1/766 60/226.2 |

FOREIGN PATENT DOCUMENTS

| | | |
|---|---|---|
| EP | 1286037 A1 | 2/2003 |
| EP | 3924254 B1 | 12/2022 |

OTHER PUBLICATIONS

EP Search Report dated Apr. 14, 2026 in re EP Application No. 25212606.5.

* cited by examiner

*Primary Examiner* — Andrew H Nguyen
(74) *Attorney, Agent, or Firm* — COATS & BENNETT, PLLC

(57) ABSTRACT

A locking system to secure a trans cowl to a frame of a thrust reverser on an engine of an aircraft. The locking system includes an arm that is connected to the trans cowl with the arm having a receptacle. A lock includes a body and a pin with the pin movable relative to the body and with the lock positionable between a locked position and an unlocked position. In the locked position, the pin is in an extended position relative to the body that extends into the receptacle to secure the trans cowl in a stowed position. In the unlocked position, the pin is in a retracted position relative to the body that is away from the arm to enable the trans cowl to move to a deployed position.

20 Claims, 9 Drawing Sheets

LOCKING SYSTEM FOR A THRUST REVERSER OF AN AIRCRAFT

TECHNOLOGICAL FIELD

The present disclosure relates generally to the field of thrust reversers on aircraft and, more specifically, to a system that secures a thrust reverser in a stowed position and enables the thrust reverser to be moved to a deployed position.

BACKGROUND

Many aircraft engines are equipped with thrust reversers. The thrust reversers use the engines thrust to slow the aircraft during landing thus helping to reduce wear on the brakes and enabling shorter landing distances for an aircraft. The thrust reversers are mounted to the aircraft and extend around a portion or entirety of the engine core of the engine. Most thrust reversers on large turbofan engines are configured to translate along the length of the engine core between a stowed position and a deployed position. In the stowed position such as during takeoff and during flight, the thrust reversers enable the thrust of the engine to propel the aircraft in a forward direction. From the stowed position, the thrust reversers translate rearward relative to the engine core to the deployed position. In the deployed position the thrust reversers are configured to divert the thrust to act against the forward travel of the aircraft.

Many current translating thrust reversers utilize a hydraulic actuation system with multiple actuators that are connected between a fixed section of the engine and the translating section. The actuators are mechanically synchronized with gearing and flexible shafts to share a load. The gearing also allows a common load path for an actuator lock that locks each of the actuators when one of the actuators is locked.

An issue with the current actuation system is it requires a complicated actuator design which makes inspection difficult. The complicated design can require a complicated indication system for pilots to determine whether the system is locked. Further, the design puts the actuation system in the primary load path holding the thrust reverser in the stowed position during flight. This may not be an efficient method to carry the load. Further, this may require larger actuators which may decrease the efficiency of the aircraft.

SUMMARY

One aspect is directed to a locking system to secure a trans cowl to a fixed structure of a thrust reverser on an engine of an aircraft. The locking system comprises an arm that is connected to the trans cowl with the arm comprising a receptacle. A lock comprising a body and a pin with the pin movable relative to the body and with the lock positionable between a locked position and an unlocked position. In the locked position, the pin is in an extended position relative to the body that extends into the receptacle to secure the trans cowl in a stowed position. In the unlocked position, the pin is in a retracted position relative to the body that is away from the arm to enable the trans cowl to move to a deployed position.

In another aspect, the receptacle comprises an opening that is contained within the arm with the arm extending completely around the opening.

In another aspect, a biasing member is positioned in the body with the biasing member configured to apply a force to the pin to bias the pin towards the extended position.

In another aspect, an anchor comprising a base is configured to be mounted to the fixed structure and a flange that extends outward from the base, wherein the lock is mounted to the flange to be spaced away from the fixed structure.

In another aspect, an opening is in the flange with the opening aligned with the pin for the pin to extend through the opening and into the receptacle of the arm when the pin is in the extended position.

In another aspect, each of the flange and the arm comprise flat surfaces that face together when the lock is in the locked position and the pin is positioned in the receptacle of the arm.

In another aspect, the base comprises an opening through which the arm extends in the locked position.

In another aspect, a control unit with processing circuitry or one or more switches configured to be mounted in the aircraft and configured to move the lock between the locked position and the unlocked position.

In another aspect, the arm is a first arm and the lock is a first lock that form a first locking combination and further comprising one or more additional locking combinations that each include an additional arm and an additional lock with each of the one or more locking combinations being selectively movable between a locked position and an unlocked position.

In another aspect, the locking combinations are configured to be mounted to the fixed structure and are spaced apart around an engine core of the engine.

One aspect is directed to a locking system to secure a trans cowl to a fixed structure of a thrust reverser on an engine of an aircraft. The locking system comprises locking combinations that are mounted to the fixed structure with each of the locking combinations comprising: an arm that is connected to the trans cowl with the arm comprising a first opening; an anchor mounted to the fixed structure and comprising a second opening; and a lock mounted to the anchor and comprising a movable pin. The locking combinations are selectively movable between a locked position and an unlocked position. In the locked position the pin extends through the first opening of the arm and the second opening of the anchor to secure the trans cowl in a stowed position. In the unlocked position the pin is away from the first opening to enable the trans cowl to move to a deployed position.

In another aspect, the pin is away from both the first opening and the second opening in the unlocked position.

In another aspect, the anchor comprises a base that is configured to be mounted to the fixed structure, a flange that extends outward from the base, and wherein the second opening is positioned in the flange and is spaced away from the base.

In another aspect, the fixed structure comprises a torque box that extends around an engine core.

In another aspect, a third opening is positioned in the anchor with the arm extending through the third opening in the locked position.

In another aspect, the locking combinations further comprise a biasing member that biases the pin towards the locked position.

One aspect is directed to a method of securing a trans cowl of a thrust reverser on an engine of an aircraft. The method comprises: with the trans cowl in a stowed position, positioning an arm that extends outward from the trans cowl at a lock; locking the lock to the arm and securing the trans cowl in the stowed position; unlocking the lock from the arm; and moving the trans cowl from the stowed position to a deployed position and moving the arm away from the lock.

In another aspect, the method further comprises in the stowed position positioning the arm in an opening in a fixed structure of the engine.

In another aspect, the method further comprises inserting a pin of the lock into an opening in the arm and locking the lock to the arm.

In another aspect, the method further comprises: aligning the arm with the lock and positioning an opening in the arm at an opening in an anchor that supports the lock; and inserting a pin of the lock through both the opening in the arm and the opening in the anchor and locking the lock to the arm.

The features, functions and advantages that have been discussed can be achieved independently in various aspects or may be combined in yet other aspects, further details of which can be seen with reference to the following description and the drawings.

DETAILED DESCRIPTION

Figure 1:
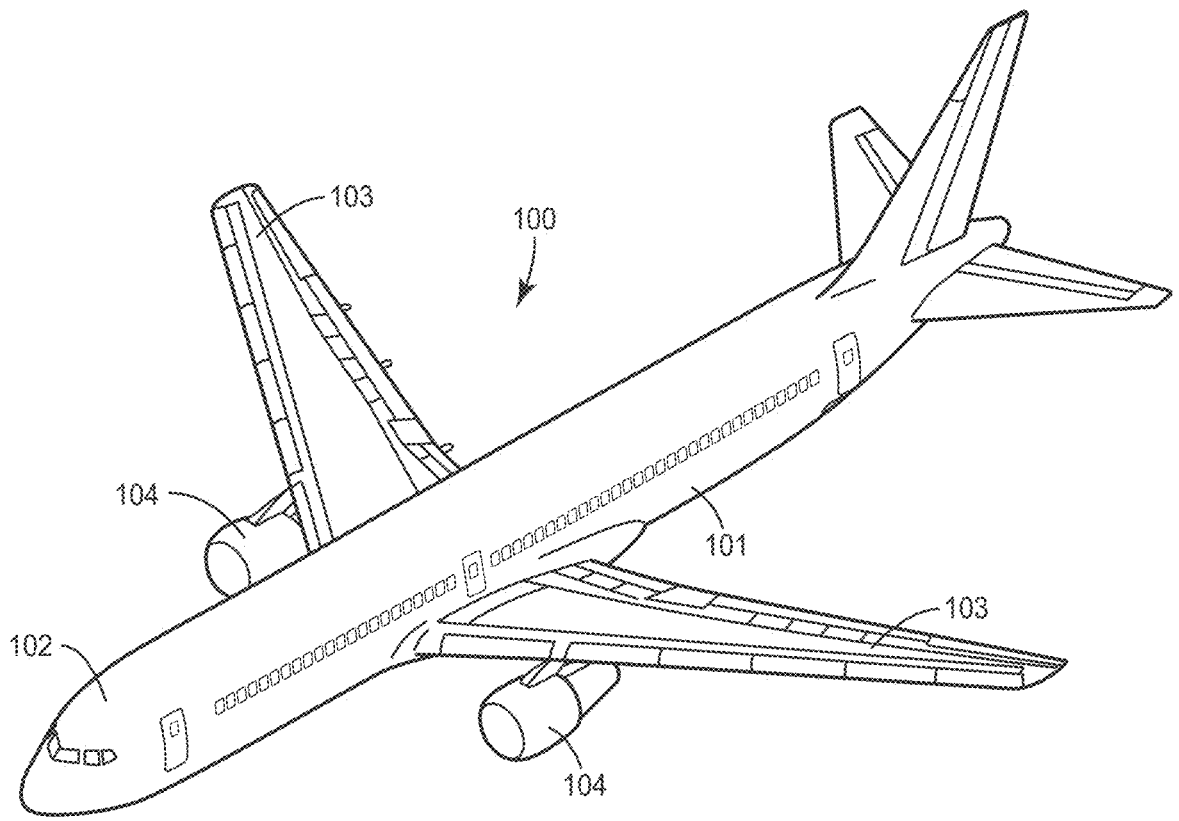
FIG. 1 is an isometric view of an aircraft.

FIG. 1 illustrates an aircraft 100 configured to transport passengers and/or cargo. The aircraft 100 generally includes a fuselage 101 with an interior space configured to accommodate passengers and/or cargo. The interior space of the fuselage 101 also includes a flight deck 102 with various controls to enable flight personnel to control the aircraft 100. Engines 104 are mounted to the wings 103 on opposing sides of the fuselage 101.

Figure 2:
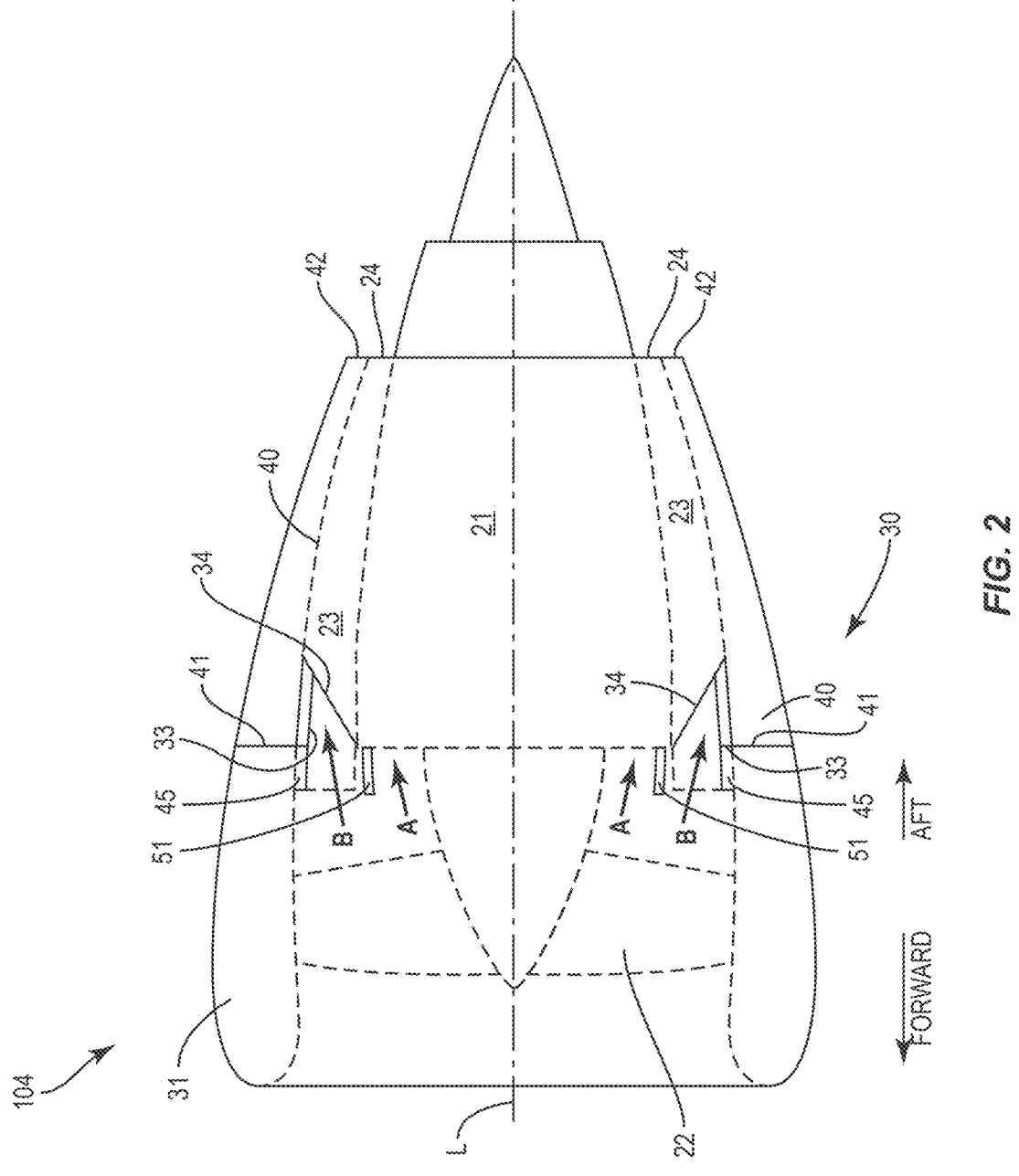
FIG. 2 is schematic section view of an engine with a thrust reverser in a stowed position.

FIG. 2 schematically illustrates an engine 104 with certain features that would be blocked from view being illustrated in broken lines. The engine 104 generally includes an engine core 21 and a nacelle 30. The engine core 21 can include a variety of different configurations, including but not limited to a turbofan engine. In some examples the engine core 21 includes a fan 22 to draw air into the engine core 21. The nacelle 30 extends around and protects the engine core 21 and fan 22. The nacelle 30 includes a forward section 31 formed by one or more of an inlet cowl and fan cowl. The forward section 31 is fixed relative to the engine core 21. The nacelle 30 also includes a trans cowl 40 that translates along a longitudinal axis L relative to the engine core 21.

Figure 3:
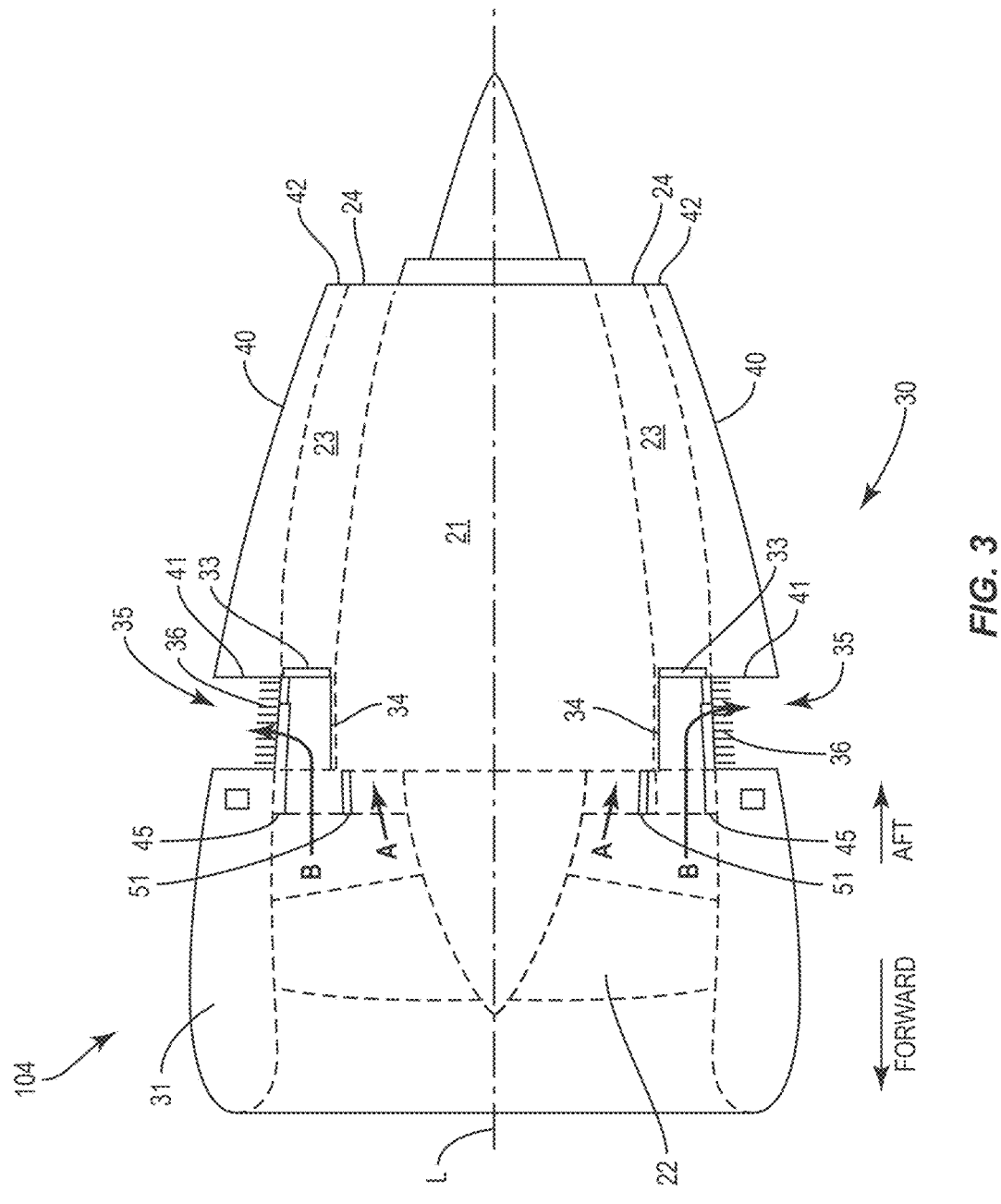
FIG. 3 is schematic section view of an engine with a thrust reverser in a deployed position.

The trans cowl 40 is configured to move between a stowed position to enable air to move through a fan duct 23 and exit through a nozzle exit 24 and a deployed position to divert the air moving through the fan duct 23. FIG. 2 illustrates the trans cowl 40 in the stowed position such as during flight. A first portion A of air that is drawn into the engine 104 is directed to the engine core 21 and a second portion B is directed to a fan duct 23. In the stowed position the trans cowl 40 is positioned forward against the forward section 31. Blocker doors 33 are positioned in an open position to allow for airflow along the length of the fan duct 23 and out through the nozzle exit 24 at an aft end. One or more drag links 34 are connected to the blocker doors 33. The drag links 34 are in a first orientation that extends across the fan duct 23 and positions the blocker doors 33 in the open position. FIG. 3 illustrates the trans cowl 40 in a deployed position. The trans cowl 40 is translated along the longitudinal axis L in an aft direction to form an opening 35 between the fixed forward section 31 and the trans cowl 40. The drag links 34 are actuated to a second orientation to position the blocker doors 33 in a closed position across the fan duct 23. This position forces the air that enters in the fan duet 23 through the opening 35. The air flows through cascade members 36 such as cascade vanes and exits as reverse efflux air flow.

The trans cowl 40 has a substantially cylindrical shape with a hollow interior sized to receive the engine core 21. The trans cowl 40 can include various different configurations. In some examples, the trans cowl 40 is a single cylindrical section. In other examples, the trans cowl 40 is formed by two or more sections. In some examples, the trans cowl 40 extends completely around the engine core 21. In other examples, the trans cowl 40 extends partially around the engine core 21.

The trans cowl 40 is part of a thrust reverser that includes a fixed structure 51. The fixed structure 51 can include various elements, such as but not limited to a torque box, hinge beam, and latch beam. In some examples, the fixed structure 51 includes a torque box that extends around the engine core 21. In some examples, the torque box is connected to a hinge beam in a top half of the thrust reverser unit and a latch beam in the bottom half of the unit. Actuators 45 are configured to move the trans cowl 40 relative to the fixed structure 51 between the stowed position and the deployed position. The actuators 45 include an elongated length with a first end connected to the trans cowl 40 and a second end connected to a fixed structure 51. The actuators 45 are configured to change length to position the trans cowl 40 between the stowed and deployed positions. In some examples, the actuators 45 have a telescoping construction with inner and outer members. The number and position of the actuators 45 relative to the trans cowl 40 and engine core 21 can vary.

A locking system 60 is configured to control the movement of the trans cowl 40 relative to the fixed structure 51. The locking system 60 is configured to be movable between a locked position and an unlocked position. In the locked position, the locking system 60 secures the trans cowl 40 in the stowed position. In the unlocked position, the locking system 60 releases the trans cowl 40 to enable movement to the deployed position.

Figures 4A, 4B:
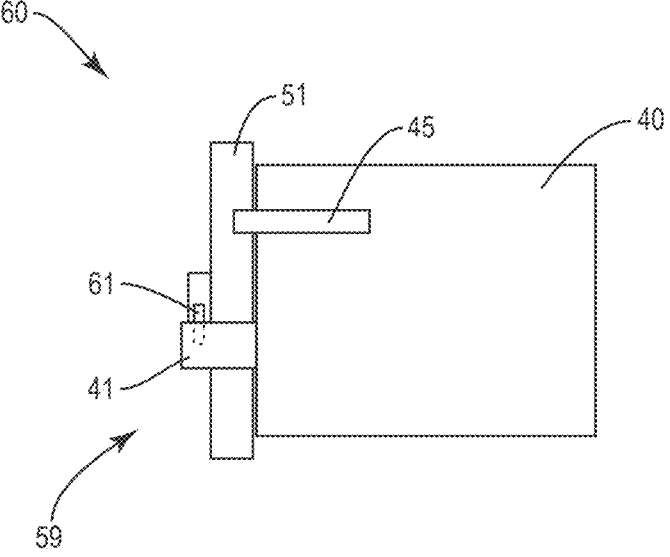
FIG. 4A is a schematic side view of a locking system in a locked position and a thrust reverser in a stowed position.
FIG. 4B is a schematic side view of the locking system of FIG. 4A with the locking system in an unlocked position and the thrust reverser in a deployed position.

FIGS. 4A and 4B schematically illustrate the thrust reverser that includes the locking system 60 that includes one or more locking combinations 59. The locking combinations 59 include a lock 61 configured to engage with an arm 41. The lock 61 is mounted to the fixed structure 51 and remains stationary relative to the translating trans cowl 40. The arm 41 is mounted to and extends outward from the trans cowl 40. When the trans cowl 40 is in the stowed position as illustrated in FIG. 4A, the arm 41 is positioned in proximity to the lock 61 and is secured in position by the lock 61. In the unlocked position as illustrated in FIG. 4B, the lock 61 is in the unlocked position which enables the arm 41 and connected trans cowl 40 to move to the deployed position.

Figure 5:
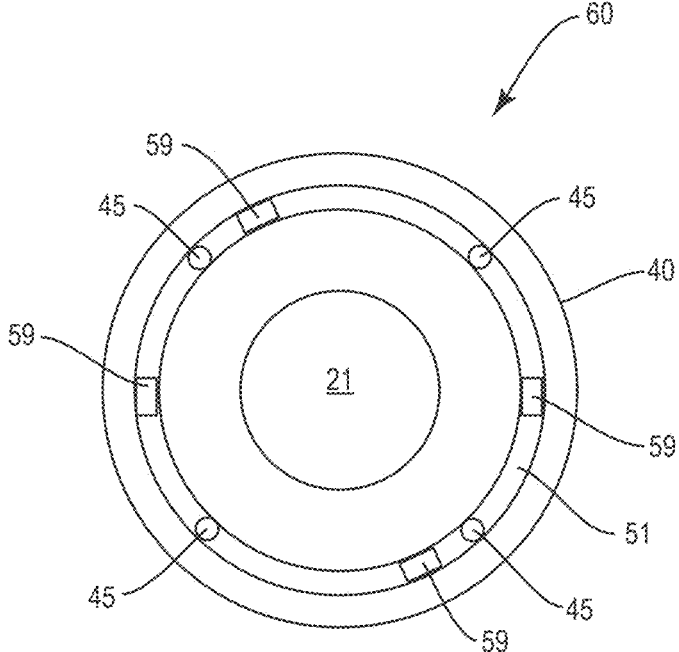
FIG. 5 is a schematic end view of locking combinations positioned at different angular positioned around the engine core.

The locking system 60 includes one or more locking combinations 59. In one example, the locking system 60 includes a single locking combination 59. In other examples, the locking system 60 includes multiple locking combinations. FIG. 5 illustrates an example with the locking system 60 including four locking combinations 59. The locking combinations are spaced apart at different angular positions on the fixed structure 51 around the engine core 21. In the example of FIG. 5, four locking combinations 59 are evenly spaced apart around the engine core 21.

Figure 6:
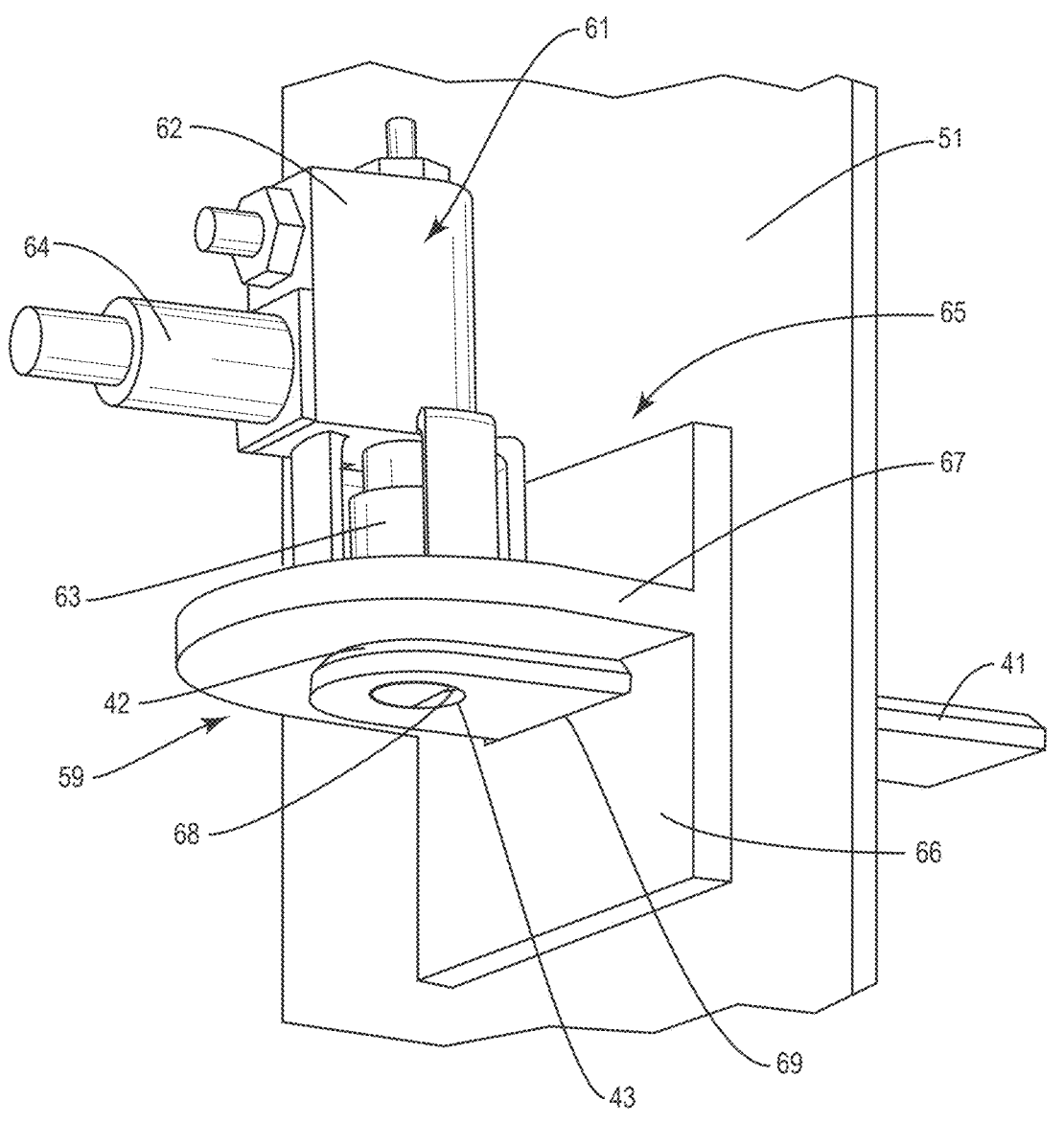
FIG. 6 is an isometric view of a lock attached to a frame and engaged with an arm to lock the thrust reverser in the stowed position.

FIG. 6 illustrates a locking combination 59 that includes an arm 41 and lock 61. The arm 41 is mounted to the trans cowl (not illustrated). The lock 61 is mounted to the fixed structure 51 by an anchor 65. The anchor 65 includes a base 66 that is positioned against and connected to the fixed structure 51. The base 66 includes an opening 69 that is aligned with an opening in the fixed structure 51. The anchor 65 also includes a flange 67 that extends outward from the base 66 away from the fixed structure 51. The flange 67 also includes an opening 68. When the trans cowl 40 is in the stowed position, the arm 41 extends through the opening 52 in the fixed structure 51 and the opening 69 in the base 66 of the anchor 65. The arm 41 includes receptacle, such as an opening 43, that aligns with the opening 68 in the flange 67.

The lock 61 includes a body 62 that is mounted to the flange 67. A pin 63 is positioned in and movable relative to the body 62. A valve 64 is mounted to the body 62 and configured to move the pin between the different positions.

In some examples, the flange 67 of the anchor 65 and the arm 41 form a clevis structure. The pin 63 in the locked position extends through both the flange 67 and arm 41 to secure these two components together.

Figure 6A:
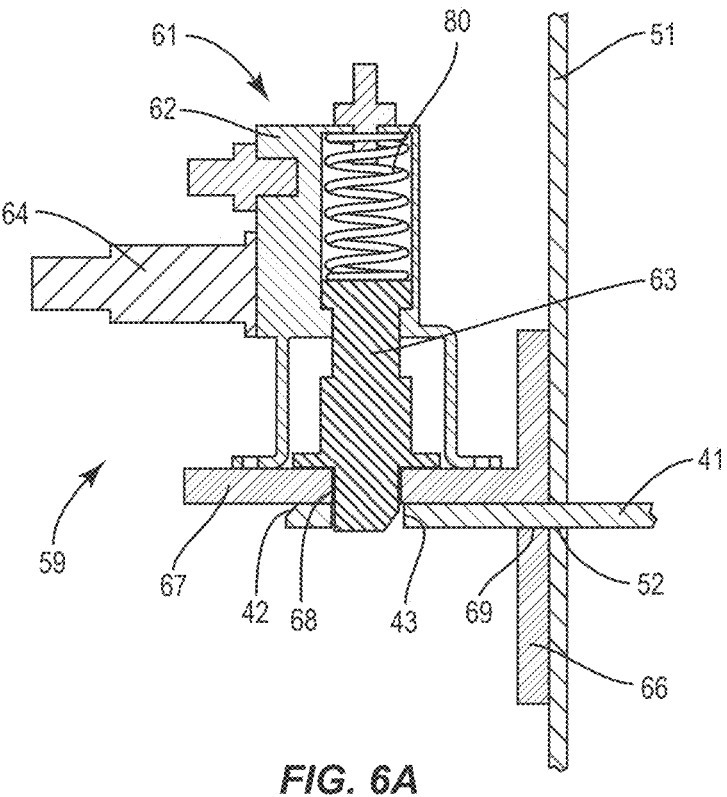
FIG. 6A is a sectional view of FIG. 5 with the lock in a locked position.

FIG. 6A is a section view of the locking combination 59 in a locked position that secures the trans cowl 40 in the stowed position. The arm 41 attached to the trans cowl 40 extends through the opening 52 in the fixed structure 51 and the opening 69 in the base 66. In some examples, the surfaces of the arm 41 and flange 67 are planar and substantially smooth to facilitate the arm 41 sliding across the flange 67 during insertion. In some examples, the arm 41 includes a chamfer 42 at the distal end along the upper side (i.e., the side that faces towards the lock 61). The chamfer 42 contacts with the corresponding chamfer on the pin 63.

The pin 63 of the lock 61 extends into the opening 68 in the flange 67 and the opening 43 in the arm 41. This positioning of the pin 63 secures the arm 41 and prevents the trans cowl 40 from moving from the stowed position. In some examples, the lock 61 includes a biasing member 80 that biases the pin 63 towards the locked position. Actuation of the valve 64 overcomes the force of the biasing member 80 and moves the pin 63 to an unlocked position.

Figure 6B:
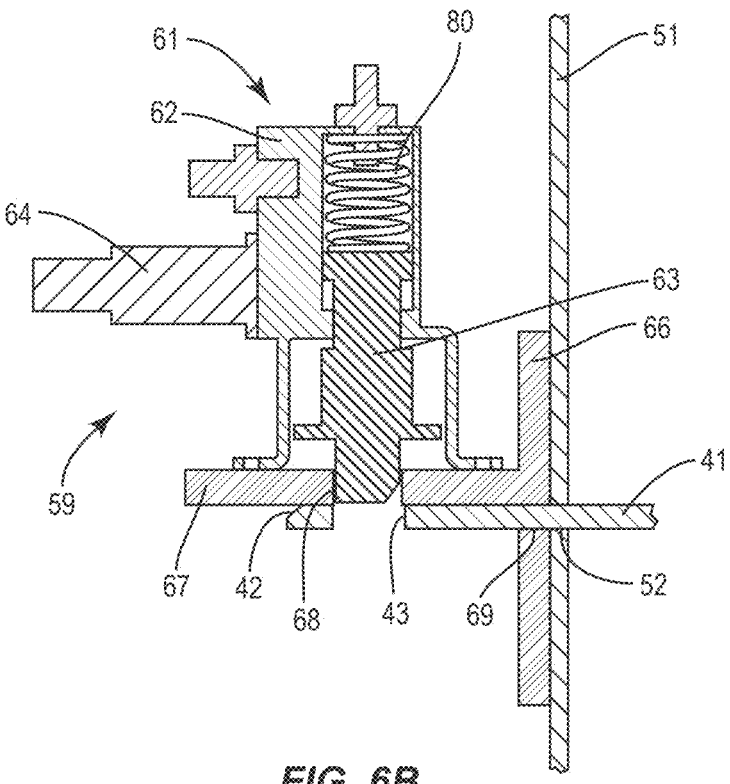
FIG. 6B is a section view of the lock of FIG. 5 in an unlocked position.

FIG. 6B illustrates the lock 61 in the unlocked position. The pin 63 is moved to a recessed positioned away from the opening 43 in the arm 41. This positioning enables the one or more actuators 45 to move the trans cowl 40 from the stowed position to the deployed position. This movement causes the arm 41 to move along the flange 67 and out of the opening 69 in the base 66 and opening 52 in the fixed structure 51. The arm 41 moves away from the fixed structure 51 as the trans cowl 40 is deployed.

Figure 7:
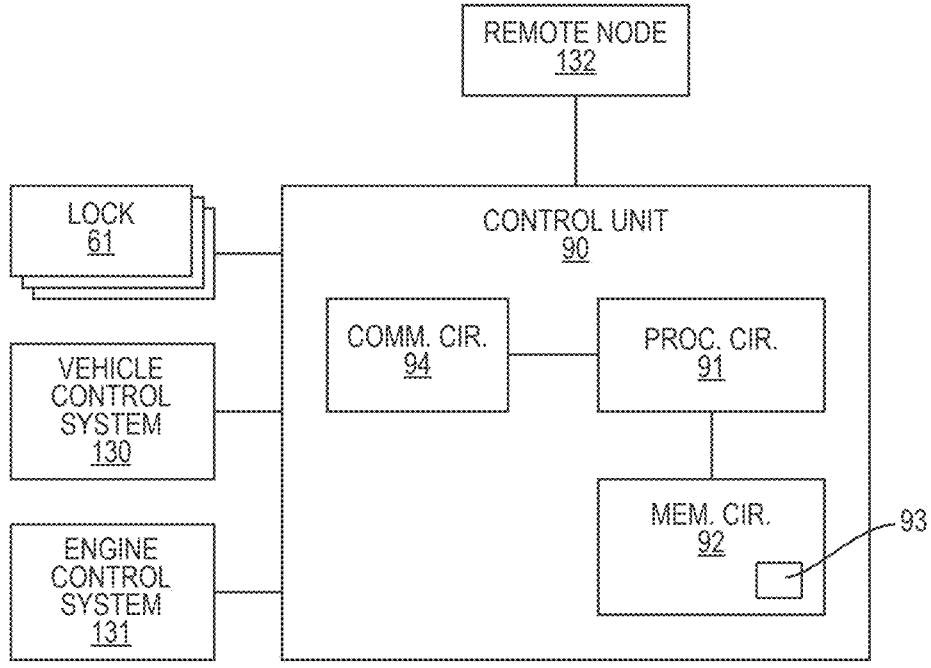
FIG. 7 is a schematic diagram of a control unit.

A control unit 90 as illustrated in FIG. 7 controls the operation of the locks 61 of the locking system 60. The control unit 90 includes processing circuitry 91 that controls overall operation of the locks 61 according to program instructions 93 stored in memory circuitry 92. The processing circuitry 91 can include one or more circuits, microcontrollers, microprocessors, hardware, or a combination thereof. The processing circuitry 91 can include various amounts of computing power to provide for the needed functionality. In some examples, the control unit 90 includes an analog switch configured to move the lock 61 between the locked and unlocked positions.

Memory circuitry 92 includes a non-transitory computer readable storage medium storing the program instructions, such as a computer program product, that configures the processing circuitry 91 to implement one or more of the techniques discussed herein. Memory circuitry 92 can include various memory devices such as, for example, read-only memory, and flash memory. Memory circuitry 92 can be a separate component as illustrated in FIG. 7 or can be incorporated with the processing circuitry 91. Alternatively, the processing circuitry 91 can omit the memory circuitry 92, e.g., according to at least some embodiments in which the processing circuitry 91 is dedicated and non-programmable.

Communication circuitry 94 provides for communications to and from the control unit 50. Communications can occur with the locks 61 to control the positioning between the locked and unlocked positions. The communications can also include communications with other circuitry on the aircraft 100 such as but not limited to a vehicle control system 130 that oversees operation of the aircraft 100 and an engine control system 131 that oversees operation of an engine 104. Communications can also occur with one or more remote nodes 132 (e.g., airline base, Federal Aviation Administration) that are located off the aircraft 100. The different communications can occur in a single direction, such as sending signals to the locks 61, or two-way communication such as communications with the vehicle control system 130.

In some examples, the control unit 90 is a separate component configured to control the operation of the locking system 60. In other examples, the control unit 90 is incorporated within another component, such as within the vehicle control system 130 or engine control system 131.

Figure 8:
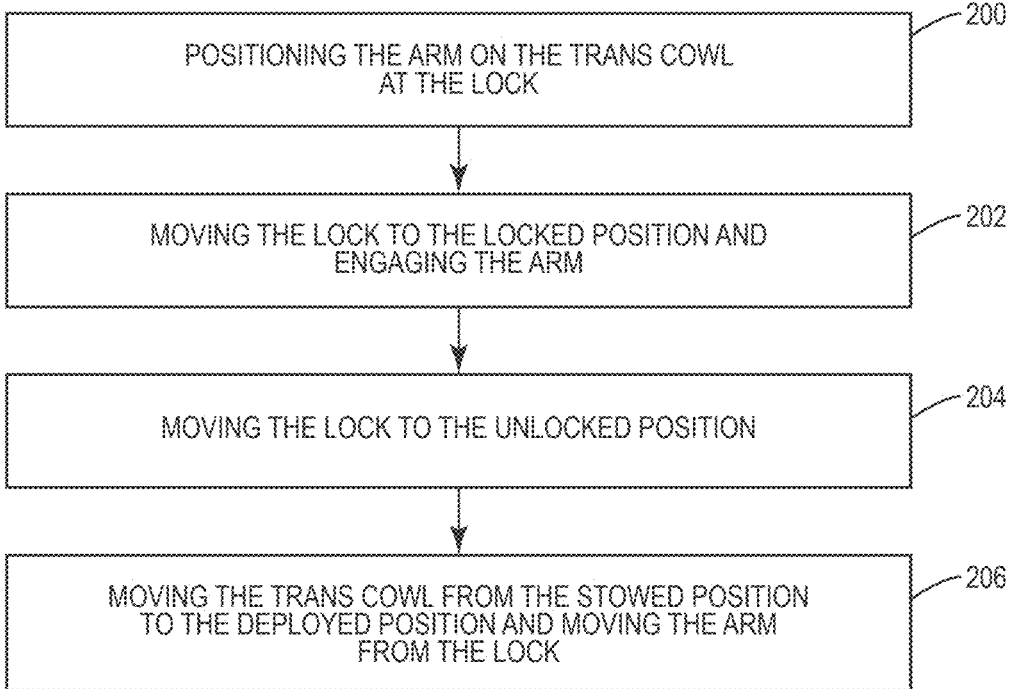
FIG. 8 is a flowchart diagram of a method of securing a thrust reverser of an engine of an aircraft.

FIG. 8 illustrates a method of securing a trans cowl 40. In the stowed position, the arm 41 on the trans cowl 40 is positioned at the lock 61 (block 200). In some examples, this occurs as the actuators 45 are moving the trans cowl 40 from the deployed position to the stowed position. As the trans cowl 40 translates along the longitudinal axis L of the engine 104, the arm 41 is moved to the lock 61. In some examples, this includes inserting the arm 41 through the opening 52 in the frame and opening 69 in the base 66. This movement also can align the arm 41 with the pin 63 of the lock 61.

After the arm 41 is positioned, the lock 61 is moved to the locked position to engage with the arm 41 (block 202). The locking secures the trans cowl 40 in the stowed position. In some examples, the locking includes moving the pin 63 of the lock through the opening 68 in the flange 67 and opening 43 in the arm 41. In some examples, the pin 63 extends completely through the arm 41. In other examples, the pin 63 is positioned with the tip of the pin 63 positioned within the opening 43 of the arm 41.

To enable the trans cowl 40 to be moved to the deployed position, the lock 61 is moved to the unlocked position (block 204). This includes retracting the pin 63 out of the opening 43 in the arm 41. This disengages the pin 63 and unlocks the lock 61 from the arm 41. Once in the unlocked position, the actuators 45 can move the trans cowl 40 from the stowed position to the deployed position (block 206). This movement positions the arm 41 away from the lock 61. In some examples, this movement includes the arm 41 sliding along the flange 67 and out of the opening 69 in the base 66 and out of the opening 52 in the fixed structure 51.

The locking system 60 can be used on a variety of different engines 104. Examples include but are not limited to turbofan engines, turboshaft engines, turbo-prop engines, and turbo-jet engines.

The locking system 60 can be used on a variety of aircraft 100. Aircraft 100 include but are not limited to manned aircraft, unmanned aircraft, manned spacecraft, unmanned spacecraft, manned rotorcraft, unmanned rotorcraft, satellites, rockets, missiles, and combinations thereof.

By the term "substantially" with reference to amounts or measurement values, it is meant that the recited character- istic, parameter, or value need not be achieved exactly. Rather, deviations or variations, including, for example, tolerances, measurement error, measurement accuracy limi- tations, and other factors known to those skilled in the art, may occur in amounts that do not preclude the effect that the characteristic was intended to provide.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A locking system to secure a trans cowl to a fixed structure of a thrust reverser on an engine of an aircraft, the locking system comprising:

an arm that is connected to the trans cowl at a forward end, the arm comprising a receptacle;

a lock comprising a body and a pin with the pin movable relative to the body and with the lock positionable between a locked position and an unlocked position with the lock positioned in front of the forward end of the trans cowl;

an anchor comprising a base configured to be mounted to the fixed structure and a flange that extends outward from the base, wherein the lock is mounted to the flange to be spaced away from the fixed structure;

an opening in the flange with the opening aligned with the pin for the pin to extend through the opening and through the receptacle of the arm when the pin is in an extended position;

wherein in the locked position, the pin is in the extended position relative to the body that extends through the receptacle to secure the trans cowl in a stowed position; and wherein in the unlocked position, the pin is in a retracted position relative to the body that is away from the arm to enable the trans cowl to move to a deployed position.

2. The locking system of claim 1, wherein the receptacle comprises an opening that is contained within the arm with the arm extending completely around the opening in the arm.

3. The locking system of claim 1, further comprising a biasing member positioned in the body, the biasing member configured to apply a force to the pin to bias the pin towards the extended position.

4. The locking system of claim 1, wherein each of the flange and the arm comprise flat surfaces that face together when the lock is in the locked position and the pin is positioned in the receptacle of the arm.

5. The locking system of claim 1, wherein the base comprises an opening through which the arm extends in the locked position.

6. The locking system of claim 1, further comprising a control unit with processing circuitry or one or more switches configured to be mounted in the aircraft and configured to move the lock between the locked position and the unlocked position.

7. The locking system of claim 1, wherein the arm is a first arm and the lock is a first lock that form a first locking combination and further comprising one or more additional locking combinations that each include an additional arm and an additional lock with each of the one or more locking combinations being selectively movable between a locked position and an unlocked position.

8. The locking system of claim 7, wherein the locking combinations are configured to be mounted to the fixed structure and are spaced apart around an engine core of the engine.

9. The locking system of claim 1, wherein the arm is positioned away from an actuator that is mounted to the trans cowl.

10. A method of securing a trans cowl of a thrust reverser on an engine of an aircraft using the locking system of claim 1, the method comprising:

with the trans cowl in the stowed position, positioning the arm that extends outward from the trans cowl at the lock;

locking the lock to the arm and securing the trans cowl in the stowed position;

unlocking the lock from the arm; and moving the trans cowl from the stowed position to the deployed position and moving the arm away from the lock.

11. The method of claim 10, further comprising in the stowed position positioning the arm in an opening in the fixed structure of the engine.

12. The method of claim 10, further comprising inserting the pin of the lock into the receptacle in the arm and locking the lock to the arm.

13. The method of claim 10, further comprising:

aligning the arm with the lock and positioning the recep- tacle in the arm at the opening in the anchor that supports the lock; and inserting the pin of the lock through both the receptacle in the arm and the opening in the anchor and locking the lock to the arm.

14. The locking system of claim 1, wherein the arm comprises a chamfer at a distal end along an upper side.

15. A locking system to secure a trans cowl to a fixed structure of a thrust reverser on an engine of an aircraft, the locking system comprising:

locking combinations that are mounted to the fixed structure, each of the locking combinations comprising:

an arm that is connected to the trans cowl, the arm comprising a first opening;

an anchor mounted to the fixed structure and comprising a second opening and a third opening;

a lock mounted to the anchor and comprising a movable pin;

wherein the locking combinations are selectively movable between a locked position and an unlocked position;

wherein in the locked position the arm extends through the third opening and the pin extends through the first opening of the arm and the second opening of the anchor to secure the trans cowl in a stowed position; and wherein in the unlocked position the pin is away from the first opening to enable the trans cowl to move to a deployed position.

16. The locking system of claim 15, wherein the pin is away from the first opening in the unlocked position.

17. The locking system of claim 15, wherein the anchor comprises:

a base that is configured to be mounted to the fixed structure;

a flange that extends outward from the base; and wherein the second opening is positioned in the flange and is spaced away from the base.

18. The locking system of claim 15, wherein the fixed structure comprises a torque box that extends around an engine core.

19. The locking system of claim 15, wherein the locking combinations further comprise a biasing member that biases the pin towards the locked position.

20. The locking system of claim 15, wherein the arm comprises a chamfer at a distal end along an upper side.

* * * * *